July 24, 1962 J. H. REAVES ETAL 3,046,489

WIDE BAND DIRECT COUPLED AMPLIFIER

Filed Nov. 28, 1958 4 Sheets-Sheet 1

INVENTORS
JOHN H. REAVES
JOHN F. WALTON

BY Hurvitz & Rose
ATTORNEYS

July 24, 1962 J. H. REAVES ET AL 3,046,489

WIDE BAND DIRECT COUPLED AMPLIFIER

Filed Nov. 28, 1958 4 Sheets-Sheet 2

INVENTORS
JOHN H. REAVES
JOHN F. WALTON
BY Hurvitz & Rose
ATTORNEYS

INVENTORS
JOHN H. REAVES
JOHN F. WALTON
BY Hurvitz & Rose
ATTORNEYS

July 24, 1962 J. H. REAVES ETAL 3,046,489

WIDE BAND DIRECT COUPLED AMPLIFIER

Filed Nov. 28, 1958 4 Sheets-Sheet 4

INVENTORS
JOHN H. REAVES
JOHN F. WALTON
BY [signature]
ATTORNEYS

United States Patent Office 3,046,489
Patented July 24, 1962

3,046,489

WIDE BAND DIRECT COUPLED AMPLIFIER

John H. Reaves, McLean, and John F. Walton, Arlington, Va., assignors to Elcor, Inc., Falls Church, Va., a corporation of Virginia Filed Nov. 28, 1958, Ser. No. 777,037
19 Claims. (Cl. 330—199)

The present invention relates to direct-coupled amplifiers and more particularly to a direct-coupled amplifier having a uniform response to signals over a wide band of frequencies.

The present invention constitutes an improvement over an amplifier described in the article Bias Supplies for Direct-Coupled Circuits, written by Mr. John H. Reaves, and appearing in the August 1954 issue of Electronics, pages 172 and 173. The circuit described in the aforesaid article employs a specially designed power supply which is connected between an anode of an amplifier tube and an anode load resistor which has one end connected to ground potential. The advantages of connecting one end of the anode load resistor of a tube to ground are many and relate primarily to the ease of coupling signals from the load resistor to the grid of a next succeeding stage without requiring D.C. voltage dropping elements. With the one end of the load resistor grounded, the D.C. voltage component across the resistor is quite small and may be easily made equal to the required bias voltage for the grid of the next succeeding stage.

The difficulty with an arrangement as described above which does not employ the aforementioned special power supply is that the shunt capacity to ground of a conventional power supply is so large that the response of the amplifier begins to fall off at frequencies in the range of 20 mc./s. or even lower. In his article, Mr. Reaves described a power supply having a shunt capacity to ground of less than 20 micro-microfarads which permitted the circuit to be employed as an amplifier for signals up to a maximum frequency of several megacycles per second, thereby extending the frequency range above that which was permissible with prior power supplies by a factor of about 100. However, the frequency response of the circuit employing the special power supply described in the aforesaid article is still limited to several megacycles per second.

It is an object of the present invention to provide a direct-coupled amplifier having a uniform frequency response over an exceptionally wide band of frequencies.

It is another object of the present invention to provide a direct-coupled amplifier having a substantially uniform frequency response to signals from zero frequency to frequencies of the order of magnitude of 40 megacycles per second.

In accordance with one embodiment of the apparatus of the present invention a special power supply, as described in the aforesaid article and more fully described in the co-pending application of John F. Walton and John H. Reaves, filed on September 13, 1957, application Serial No. 683,740, is connected in series with two resistors and an amplifier tube. The voltage supply has its negative terminal connected through a first of the resistors to ground and has its positive terminal connected through a second of said resistors to the anode of the amplifier tube which has its cathode either directly grounded or connected to ground through a cathode biasing resistor. The junction of the anode of the tube and the second resistor is coupled by means of a capacitor to a next succeeding stage of amplification while the junction of the negative terminal of the supply and the first resistor is connected through a still further or third resistor to the grid of the aforesaid second tube. The purpose of the second and third resistor and the capacitor is to compensate for the effect of the shunt capacity of the power supply at the high frequencies. At low frequencies the capacitor appears as a very high impedance and therefore little of the signal voltage passes through the capacitor to the grid of the next succeeding stage. However, the shunt capacity of the special power supply being quite low also presents an almost infinite impedance at the low frequencies so that the effective load impedance, constituting the parallel combination of the load resistance and the shunting capacitive reactance, reduces to simply the load resistance and the signal is developed across this resistor and coupled through the third resistor to the grid of the succeeding stage. At the higher frequencies when the shunt capacity of the power supply begins to produce loss of signal across the first resistor, the second and third resistors and the coupling capacitor serve as an auxiliary coupling means for passing the high frequency signal substantially unattenuated to the grid of the next stage. By properly choosing the time constants of the circuits, substantially complete compensation for the shunting effect of the shunt capacity of the power supply may be effected and the response of the tube is limited primarily by the output interelectrode capacitance of the tube, the input interelectrode capacitance of the tube of the next amplifier stage, and the shunt capacity of the various leads of the circuit.

In another embodiment of the present invention, an inductor and resistor are connected in series between the negative terminal of the aforesaid special supply and ground while the positive terminal of the supply is connected directly to the anode of the amplifier tube. The inductor forms with the shunt capacity of the supply a resonant circuit which has a low Q due to the resistance in the circuit. In consequence, high frequency compensation and efficient wide band performance is achieved. This method of compensation is quite inexpensive since the inductor is small as a result of the low value of capacity of the supply.

The circuit described immediately above is most practicable for utilization with the power supply of the aforesaid copending application while the compensation method employing the extra resistance and coupling capacitor has its greatest applicability to circuits employing power supplies having large shunt capacities to ground; such as, one thousand micro-microfarads.

In still another embodiment of the invention, the resistor connected between the anode of the tube and the supply is connected in parallel with an inductance which serves to increase the high frequency response of the system. In this case, the capacitor connected between the anode of the first tube and the grid of the second tube serves merely as a coupling capacitor and does not have any effect on the frequency response of the system. Pentodes as well as triodes may be employed, the pentodes being particularly useful as a result of their low grid-plate capacities. Various other alternative embodiments of the present invention are presented and some of these relate to bridge circuits for compensating for zero drift in the amplifier and the effects of variation in supply voltage and filament voltages upon the tubes and associated circuits.

It is another object of the present invention to provide a direct-coupled amplifier employing two load resistors with an anode power supply connected therebetween and wherein one of the load resistors is directly connected to the next succeeding stage of amplification and is employed to respond primarily to low frequency signals and wherein the voltage across the second resistor is coupled to the next succeeding stage through a coupling capacitor and is employed in a circuit to enhance the high frequency response of the amplifier.

It is yet another object of the present invention to provide a direct-coupled amplifier having high zero drift stability and having an unusually wide frequency response and which is relatively insensitive to heater voltage and heater temperature changes.

The above and still further objects, features and advantages of the present invention will become apparent upon consideration of the following detailed description of one specific embodiment thereof, especially when taken in conjunction with the accompanying drawings, wherein:

FIGURE 1 of the accompanying drawings is a schematic wiring diagram illustrating the utilization of a low capacity isolated power supply in an amplifier circuit;

Figure 1:
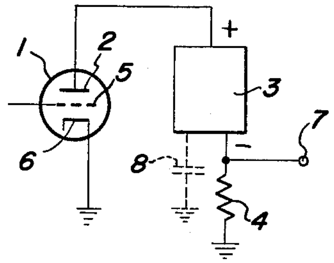

Referring specifically to FIGURE 1 there is illustrated the basic amplifier circuit discussed in the aforesaid article by Mr. Reaves. A tube 1 has its anode 2 connected to a positive terminal of a power supply 3 which is set forth in detail in the aforesaid co-pending application. The negative terminal of power supply 3 is connected through an anode load resistor 4 to ground potential. The tube 1 is further provided with a grid 5 adapted to receive signal potentials and a cathode 6 which is illustrated as connected to ground. The output voltage from this circuit is taken at the terminal 7 which is connected to the junction of the negative terminal of the source 3 and the resistor 4.

An advantage of the circuit illustrated in FIGURE 1 over conventional amplifier circuits, results from the fact that the voltage of the source 3 does not appear across the resistor 4. In the absence of a signal on the grid 5, and if it is assumed that when no signal is applied to the grid the tube is non-conductive, the terminal 7 is at ground potential and therefore may be directly connected to the grid of the next succeeding amplifier stage without requiring a capacitor to block high potentials from the grid. The terminal 7 may be maintained at a negative potential by rendering the tube 1 conductive in the absence of an input signal and by controlling the degree of conductivity of the tube various biases may be obtained for the next succeeding stage of the amplifier.

The circuit illustrated in FIGURE 1 is rendered practical by utilizing a special power supply 3 which has an extremely low shunt capacity to ground, this capacitance being illustrated by the dashed line capacitor 8. If the value of the capacitance 8 is that of a normal power supply, the capacitive shunting effect would be so great that the amplifier would be substantially useless except at low frequencies. However, the power supply of the aforesaid application has a shunt capacity to ground of the order of magnitude of 10 to 20 micro-microfarads so that the response of the amplifier may be maintained up to several megacycles per second. Signals above several megacycles, however, do suffer materially as a result of the shunt capacity and this represents a limitation upon the use of the amplifier of FIGURE 1.

Figures 2, 4, 5:
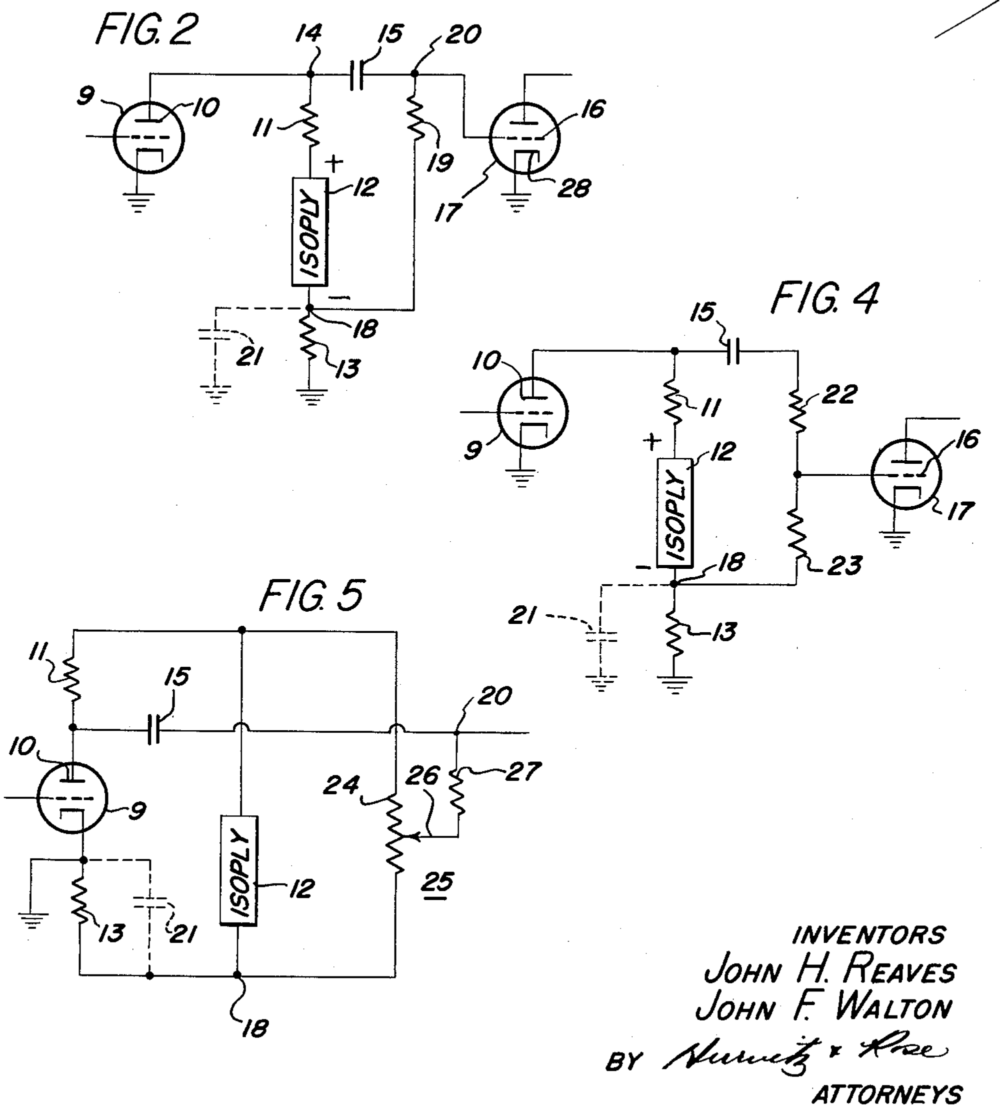
FIGURE 2 is a schematic wiring diagram of a modification of FIGURE 1 in which high frequency compensation is provided.
FIGURE 4 is a schematic wiring diagram of a modification of FIGURE 2.
FIGURE 5 is a schematic wiring diagram illustrating the application of high frequency compensation techniques of FIGURE 2 to a bridge-type amplifier.

The amplifier of the present invention, and reference is now made to FIGURE 2 of the accompanying drawings, employs a high frequency compensation circuit to overcome the effects of the shunt capacity of the power supply 3.

Referring now specifically to FIGURE 2 of the accompanying drawings, a tube 9 has an anode 10 connected through a resistor 11 to the positive terminal of an anode power supply 12. The negative terminal of the anode power supply 12 is connected through a further resistor 13 to ground potential. The junction of the resistor 11 and anode 10, which is designated as point 14, is coupled through a capacitor 15 to a grid 16 of a tube 17 of the next succeeding stage of amplification. The junction of the negative terminal of the supply 12 and the resistor 13, which is hereinafter designated as the point 18, is connected through a resistor 19 to the junction of the capacitor 15 and grid 16 which is designated as the point 20. The shunting effect of the capacity of the power supply 12 to ground is illustrated as a dashed line capacitor 21 connected in parallel with the resistor 13.

At the lower frequencies of operation, the capacity 15 appears as a very high impedance so that substantially none of the signal appearing at the point 14 is coupled through the capacitor to the point 20 and the grid 16. At the low end of the frequency spectrum the capacitor 21 also appears as a very high impedance so that a large signal voltage at the lower frequencies appears across the resistor 13. The voltage across resistor 13 is coupled substantially unattenuated through the resistor 19 to the grid 16 of the tube 17. At the higher end of the frequency spectrum, when the capacitor 21 begins to lower the impedance between point 18 and ground, the attenuation produced by the capacitor 15 is considerably less than at the lower frequencies so that a substantial portion of the signal across the resistor 11 is coupled through the capacitor 15 to the grid 16 of the next succeeding stage. By properly choosing the values of the capacitor 15 and resistors 11, and 19 on the one hand, and the resistor 13 and capacitance 21 on the other hand, the circuit may be substantially completely compensated for the shunt capacity effect of the power supply 12. As an approximation the capacitor 15 and resistor 19 may be regarded as a differentiation circuit having a time constant approximately equal to the time constant of resistor 13 and capacitor 31.

Figure 3:
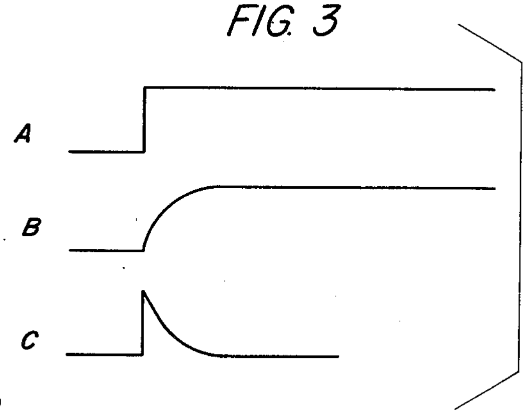
FIGURE 3 is an illustration of a series of graphs showing the operation of a compensation circuit of FIGURE 2.

Reference is now made to FIGURE 3 of the accompanying drawings, which illustrates the operation of the circuit of FIGURE 2 in response to a square wave input. Graph A illustrates an idealized square wave signal which may be applied to the grid of the tube 9. Graph B is a graph of the voltage appearing at the point 18; that is, of the response of the low frequency section of the circuit comprising resistors 13 and capacitor 21. Graph C is a plot of the response of the high frequency section of the circuit comprising resistor 11, capacitor 15, and resistor 19 or resistor 19 in association with the input impedance of tube 17. It will be noted that the addition of Graph C to Graph B produces a wave which is substantially identical with that illustrated in the Graph A.

The capacitor 15 and resistors 11 and 19 constitute a circuit that produces a spiked response to the square wave which compensates for the initial delay in development of the signal voltage across the resistor 13 due to the necessity for charging the capacitor 21. It has been found that the best compensation is achieved when the time constant of the circuit including resistor 11, capacitor 15, and resistor 19 is substantially equal to the time constant of the circuit comprising resistor 13 and capacitor 21. Since compensation by the circuit of FIGURE 2 depends upon choosing proper time constants the capacity to ground of the supply 12 may be quite large.

In the circuit of FIGURE 2, the capacitor 15 serves a dual purpose; that of a coupling capacitor which prevents the high voltage at the point 14 from appearing on the grid 16 of the tube 17 and further as a capacitor in a differentiating circuit for compensating for the loss in signal due to the capacity 21 of the supply 12.

Another feature which is of interest with respect to the amplifier illustrated in FIGURE 2 is the relative values of the resistors 11 and 13. It can be seen that the signal appearing at the point 14 is in effect divided across the resistors 11 and 13 and therefore as a general rule the two resistors should be of the same value. Actually the resistor 11 should lie between one-half and one times the value of the resistor 13 if it is desired to have a uniform response to frequencies across the response band of the amplifier. In some amplifier circuits it may be desirable to have a response which is less at one frequency range than at other and the values of the resistors 11 and 13 may be adjusted accordingly.

The circuit illustrated in FIGURE 4 of the accompanying drawings is substantially the same as that illustrated in FIGURE 2 and those elements which are common to both figures bear the same reference numerals. In the circuit of FIGURE 4 the resistor 19 is replaced by two resistors 22 and 23 and the grid 16 of the tube 17 is connected to the junction of these latter two resistors. The attenuation of the signal appearing at the point 20 produced by the resistor 22 reduces the high frequency compensation of the circuit and if either of the resistors 22 and 23 are variable or the resistors 22 and 23 form the resistive element of a potentiometer with a variable tap, ready compensation for various values of the resistor 11 may be achieved. It is to be understood that the concept of a voltage divider between points 20 and 18 may be employed in any of the subsequent circuits described in this application.

Referring now to FIGURE 5 of the accompanying drawings, there is illustrated a still further modification of the circuit illustrated in FIGURE 2. The underlying concept of the bridge circuit employed in FIGURE 5 is described in detail in co-pending application Serial No. 777,033, filed on November 28, 1958, by John F. Walton for Bridge Type Direct Coupled Amplifier, assigned to the same assignee as the present invention. The circuit elements of FIGURE 5 which correspond with the circuit elements of FIGURE 2 bear the same reference numerals as the corresponding elements in FIGURE 2.

Referring specifically to the circuit illustrated in FIGURE 5, a resistive element 24 of a potentiometer 25 is connected across the power supply 12. A variable tap 26 of the potentiometer 25 is connected through a resistor 27 to the point 20 in the circuit; that is, the grid 16 of the tube 17. In the circuit illustrated in FIGURE 2 current flow through the tube 9 causes the point 20 to go negative with respect to ground. In the absence of current flow the point 18 is at ground potential, but as the tube draws current, the potential of this point becomes negative. In cases where the load resistor 13 is of such a high impedance that the tube's quiescent current causes the potential of the point 18 to be excessively negative for direct connection to the grid 16, the potentiometer is employed to effect a decrease in the negative bias level. Therefore the bias on the grid 16 of tube 17 may be varied at will. More particularly, since the resistor 24 is connected across the supply 12, the voltage at the upper end of the resistor 24, in the absence of current flow through the tube 9, is equal to the positive voltage of the supply whereas the voltage at the lower end of the resistor 24; that is, the end connected to the point 18, is at ground potential. Therefore, by suitably adjusting the tap 26 on the resistor 24 the D.C. potential applied to the grid 16 of the tube 17 can be made to assume any desired value. Since both ends of the resistor 24 experience the same change in potential upon the application of a signal thereto, there is no attenuation of the signal coupled through the resistor 27 to the grid 16. A further advantage of the circuit is that its bridge-like arrangement renders the circuit relatively insensitive to variations in supply voltage.

The circuit illustrated in FIGURE 5 in all other respects is the same as the circuit illustrated in FIGURE 2, and the low frequency components of the signal appearing at the point 18 are applied without attenuation through both portions of the resistor 24 to the tap 26 and through the resistor 27 to the output terminal 20. Again, the high frequency components of the signal appearing at the point 14 are coupled through the capacitor 15, to the grid 16 of the tube 17.

Figures 6, 7:
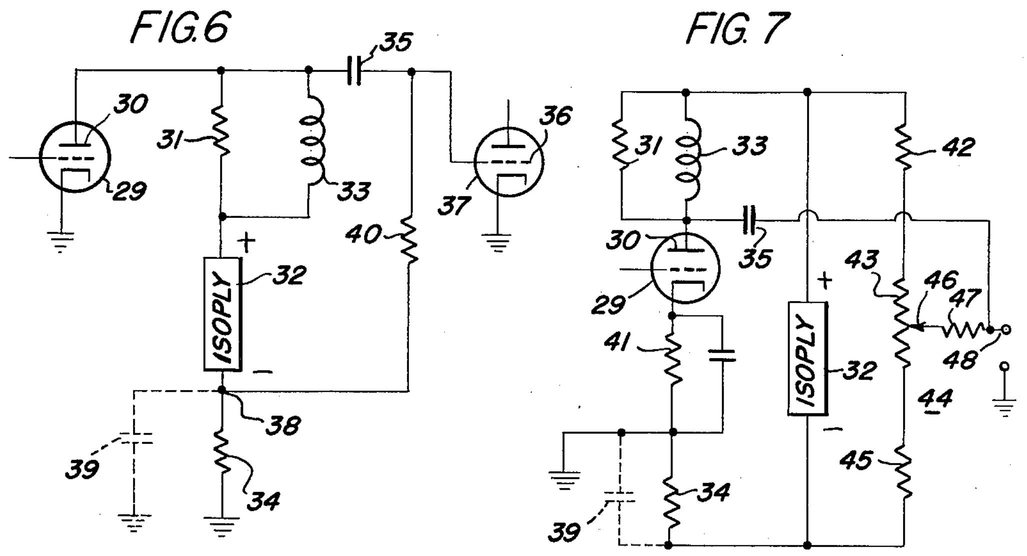
FIGURE 6 is a schematic wiring diagram of a second type of high frequency compensation circuit.
FIGURE 7 is a schematic wiring diagram of the application of the compensating circuit of FIGURE 6 to a bridge-type amplifier.

An alternative method of compensation which does not employ a capacitive differentiating circuit is illustrated in FIGURE 6 of the accompanying drawings. Referring specifically to FIGURE 6, a tube 29 has an anode 30 connected through a resistor 31 to a positive terminal of a power supply 32. The resistor 31 is shunted by an inductor 33 having a relatively low direct current resistance. The negative terminal of the power supply 32 is connected through a resistor 34 to ground. The anode 30 of the tube 29 is further connected through a coupling capacitor 35 to a grid 36 of a further amplifier tube 37. The junction of the power supply 32 and resistor 34, which is hereinafter referred to as point 38, is shunted by the capacity to ground of the power supply 32 which is designated by the reference numeral 39. Point 38 is further connected through a resistor 40 to the grid 36 of the tube 37.

In the present embodiment of the invention, at low frequencies the inductor 33 appears as a very low impedance so that substantially none of the signal is attenuated in passing through this portion of the circuit and substantially all of the signal appears across the resistor 34 and is coupled to the grid 36 through the resistor 40. As the frequency increases the effective impedance of the inductor 33 increases, and the shunt capacitance 39 begins to reduce the impedance of the parallel combination of capacitor 39 and resistor 34. Therefore, an increasing proportion of the signal is developed across the load comprising resistor 31 and inductor 33.

The resistor 31 and inductor 33, connected in parallel, comprise a high pass filter while the resistor 34 and capacitance 39 form a low pass filter. The time constants of the two filters are made approximately equal so that their actions are complementary and the gain of the stage is uniform over the desired frequency spectrum. The capacitor 35 in this embodiment of the invention, is employed strictly as a coupling capacitor and is made sufficiently large that it does not interfere with the operation of the high pass or the low pass filters. More specifically, the time constant of capacitor 35 and resistor 40 is many times the time constant of the circuit of resistor 31 and inductor 33.

Referring now to FIGURE 7 of the accompanying drawings, there is illustrated a modification of the circuit of FIGURE 6 in which a voltage divider is coupled across the power supply in order to provide for variation in the D.C. bias of the output signal and to render the circuit insensitive to variations in supply voltage. Those elements which are common to FIGURES 6 and 7 bear the same reference numerals in both figures. In the circuit of FIGURE 7 a cathode resistor 41 has been added and is connected between the cathode of the tube 29 and ground potential. A voltage divider is connected across the power supply 32 and comprises a fixed resistor 42, a resistor 43 of a potentiometer 44 and a further resistor 45. The impedance of the resistor 42 is equal to the D.C. impedance of the parallel circuit of the resistor 31 and the inductor 33. The impedance of the resistor 45 is equal to the impedance of the resistor 34 while the impedance of the resistor 43 of the potentiometer 44 is equal to the no signal impedance of the tube 29 and the cathode resistor 41.

The circuit constitutes a resistance bridge in which the resistors 42, 43 and 45 comprise one leg of the bridge and the resistors 34 and 41, the tube 29 and the parallel combination of resistor 31 and inductor 33 constitute the other leg of the bridge. The potentiometer 44 is provided with a tap 46 movable over the resistor 43 and the tap 46 is connected through a further resistor 47 to an output terminal 48 which may be connected to the grid of the next succeeding stage of amplification. It will be noted that the arrangement of FIGURE 7 is substantially the same as the arrangement of FIGURE 5 except that the voltage divider comprises three distinct resistors rather than the single resistor 24 in FIGURE 5 and the cathode resistor 41 has been added.

Returning to FIGURE 7, the input signals applied to the grid of the tube 29 control the current flow through the tube and its series connected elements so that a voltage is developed at the junction of the resistor 34 and the negative terminal of the power supply 32. This same signal also appears at the positive terminal of the power supply so that the signal appears unattenuated at the tap 46 of the potentiometer 44. In the absence of a signal, the bridge is balanced, and the voltage appearing at the terminal 48 may be made zero or any other desired value depending upon the position of the tap 46.

The anode 30 of the tube 29 is connected through the capacitor 35 to the output terminal 48 and therefore the high frequency signals developed across the combination resistor 31 and inductor 33 are coupled to the output terminal. The circuit operates the same as the circuit of FIGURE 6 in that elements 31 and 33 comprise a high pass filter and elements 34 and 39 comprise a low pass filter and the frequency response of the circuit is uniform over a very large frequency range.

Figure 8:
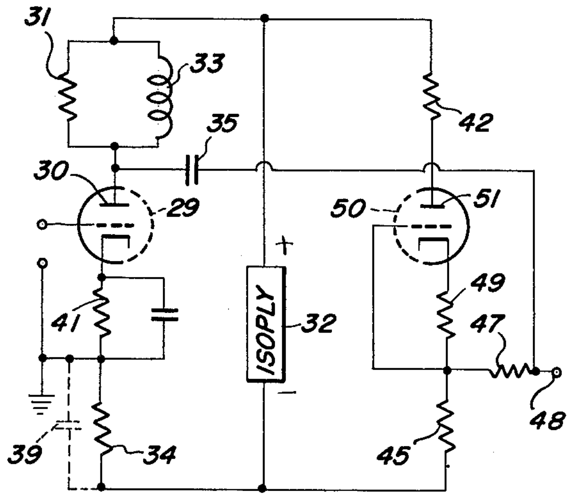
FIGURES 8 and 9 are schematic wiring diagrams of modifications of the circuit of FIGURE 7.

Referring now to FIGURE 8 of the accompanying drawings, there is illustrated another bridge-type amplifier in which the potentiometer resistor 43 of FIGURE 7 and 8 is replaced by a tube and its cathode resistor. Those elements which are common to FIGURES 7 and 8 bear the same reference numerals. The circuit illustrated in FIGURE 8 exclusive of the resistor 31, inductor 33, and capacitor 35 and resistor 47 is the same as a circuit which forms the subject matter of the aforesaid copending patent application of Walton. In the copending application many advantages of the bridge circuit employing two tubes are discussed and relate primarily to compensation for variations in filament temperature and tube characteristics.

The circuit constitutes an amplifying leg which comprises resistors 34, and 41, tube 29 and a voltage divider leg comprising resistor 45 and a cathode resistor 49 connected in series with a tube 50 having an anode 51 connected to the lower end of the resistor 42. The lower end of the resistor 49 is connected to the junction of resistors 45 and 47. The signal developed in the left leg of the bridge appears at the junction of the resistor 34 and the negative terminal of the supply 32 and also at the junction of the positive terminal of supply 32 and the resistor 42. Therefore, the elements 42, 50, 49 and 45 merely serve as a voltage divider so that the signal voltage appears unattenuated at the junction of resistors 45 and 49 and the D.C. bias of the signal is a function of the relative values of the impedances in the right leg of the bridge. Since the resistors 34 and 45 are equal in value, the D.C. resistance of the combination of resistor 31 and inductor 33 is equal to the resistance of the resistor 42, the two cathode resistors 41 and 49 are equal, and the no signal plate impedance of the tubes 29 and 50 are equal, the bridge is balanced and the junction of the resistors 45 and 49 is at ground potential in the absence of a signal. Upon a signal being applied to the tube 29, the D.C. potential of the output signal does not vary but a signal potential is superimposed thereupon. The purpose for utilizing the resistor 49 and tube 50 is to compensate for changes in the tube 29 with age and with variations in the heater voltage and cathode emission. The tubes 29 and 50 actually constitute the two halves of a triode having a common heater and therefore the majority of variations in tube parameters are reflected equally in both of the triode sections. As in the embodiment of the invention illustrated in FIGURE 7, the A.C. signal appearing at the anode 30 of the tube 29 is coupled through the capacitor 35 directly to the output terminal 48. The operation of the high pass filter is the same as in both FIGURES 6 and 7, so that this circuit has all the advantages of the circuits illustrated in all of the preceding figures. In addition, inductor 33 may be eliminated and the time constant of the capacitor 35 in combination with resistors 31 and 47 chosen so as to give the desired compensation as is provided in the circuit of FIGURE 2. One difference between the compensation circuit illustrated in FIGURE 2 and the compensation circuit of the type illustrated in FIGURE 6 is the voltage drop across the resistor connected between the power supply and the tube anode. At the lower frequencies there is substantially no voltage drop across the resistor 31 of FIGURE 6 whereas if the inductor 33 were eliminated as in FIGURE 2 there would be a drop across the resistor 31 of the same order of magnitude as the drop across resistor 34. As a result, the circuit of FIGURE 2 must employ a power supply having a somewhat higher voltage than the power supply employed in the circuit of FIGURE 6.

Figure 9:
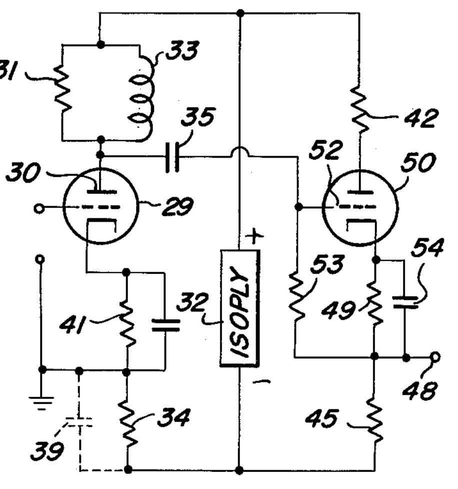

FIGURE 9 is an extension of the circuit of FIGURE 8 in which the tube 50 is employed in the dual role of a compensating tube and as a cathode-follower amplifier for the high frequencies. Again, those elements which are common to FIGURES 21 and 22 bear the same reference numerals. In FIGURE 9, the capacitor 35 instead of being connected directly to the output terminal 48 is connected to a grid 52 of the tube 50 and also through a grid resistor 53 to the junction of the resistor 45 and cathode resistor 49. The cathode resistor 49 is by-passed for high frequency signal potentials by a capacitor 54. At low frequencies the operation of this circuit is the same as that illustrated in FIGURE 8 and the tube 50 merely serves as a resistance which varies substantially in the same manner as the resistance of the tube 29 and therefore provides drift and temperature compensation for the circuit. However, as the frequency of the signal increases, the voltage appearing at the anode 30 of the tube 29 increases and this signal is coupled through capacitor 35 to the grid 52 of tube 50. The signals applied to the grid 52 of the tube 50 are amplified and appear across the resistor 45 and therefore at the output terminal 48. In consequence, in this embodiment of the invention, the tube 50 serves the dual function of a variable resistance and of an amplifier tube as opposed to its utilization in FIGURE 8 simply as a variable resistor. The capacitor 54 is employed to by-pass high frequency signal potentials about the resistor 49 so as not to disturb its voltage bias function.

Figure 10:
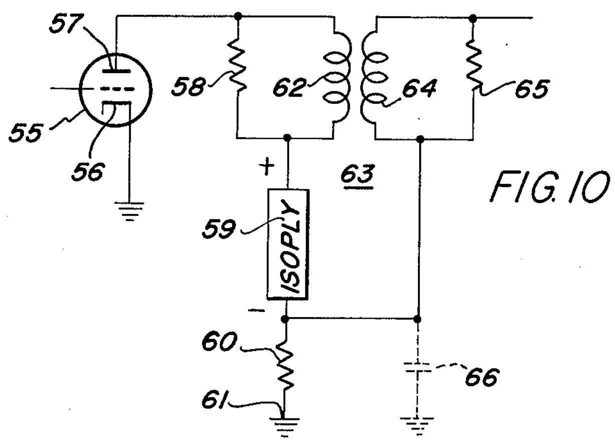
FIGURE 10 is a schematic wiring diagram of a third form of high frequency compensation circuit.

The frequency response of the circuits thus far illustrated is limited primarily by the output interelectrode capacitance of the anode circuit of the amplifier stage under conduction, and the input interelectrode capacitances of the next succeeding amplifier stage. In order to overcome these unavoidable interelectrode capacities the circuit of FIGURE 10 may be employed. In FIGURE 10 a tube 55 has its cathode 56 grounded and its anode 57 connected through a resistor 58 to the positive terminal of a power supply 59. The negative terminal of the power supply 59 is coupled through a load resistor 60 to ground. The resistor 58 is shunted by a primary winding 62 of a transformer 63 having a secondary winding 64. The winding 64 is shunted by a resistor 65 and has one end connected to the junction of the negative terminal of supply 59 and the resistor 60. The other end of the winding 64 may be connected directly to the grid of the next succeeding stage which is not illustrated. In this circuit the inductance of the winding 62 is made to resonate with the output interelectrode capacity of the tube 55 and the secondary winding 64 is made to resonate with the input interelectrode capacity of the next succeeding stage. The windings 62 and 64 are shunted by resistors 58 and 65 and therefore the resonant circuits have relatively low Q's so that a flat frequency response is achieved.

Figure 11:
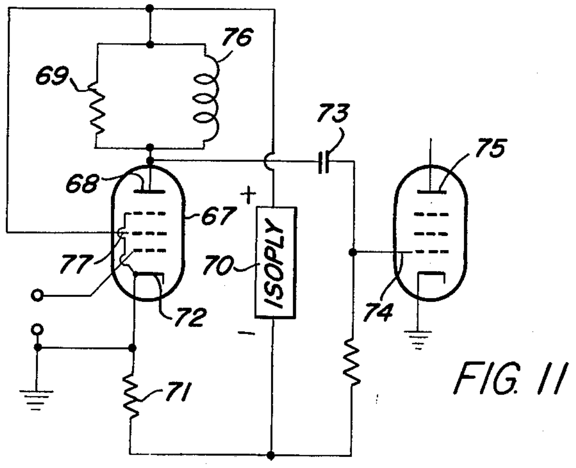
FIGURE 11 is a schematic wiring diagram of the application of a high frequency compensation circuit of FIGURE 7 to a pentode amplifier.

Referring now to FIGURE 11 there is illustrated another circuit for reducing the effects of the interelectrode capacities of the tubes upon frequency response of the circuit of FIGURE 6. It is well-known that the interelectrode capacities of pentodes are considerably less than those of triodes and therefore the circuit in FIGURE 11 is specifically designed to utilize a pentode. A pentode 67 has an anode 68 connected through a resistor 69 to a positive terminal of a power supply 70. The negative terminal of the supply 70 is connected through a load resistor 71 to ground potential and a cathode 72 of the tube 67 is also connected to ground potential. The anode 68 of the tube 67 is also connected through a coupling capacitor 73 to a grid 74 of a pentode 75 of the next succeeding stage of the amplifier and the resistor 69 is shunted by an inductor 76. The tube 67 is also provided with a screen grid 77 which is connected to the positive terminal of the supply 70. At the low frequencies the pentode 67 operates as a triode since the impedance of the inductor 76 is so small that the anode 68 and screen grid 77 both appear to be connected to the positive terminal of the supply 70. At the low frequencies, the interelectrode capacities of the tube are unimportant and therefore the operation of the tube as a triode does not affect the frequency response of the circuit. In the range of frequencies at which the effect of the interelectrode capacity of the tube 68 becomes appreciable the impedance of the inductor 76 is relatively high and the tube begins to operate as a pentode since the anode 68 and screen grid 77 operate at different potentials. Specifically, at the high frequencies when the shunt capacity of the supply 70 has an appreciable effect, the supply 70 appears in the role of a conventional supply, by-passed to ground, and its positive terminal becomes an ideal point from which to obtain the screen grid supply voltage. The circuit comprising resistor 69 and inductor 76 serves its original function as a compensating circuit for high frequencies in addition to being employed as a switching circuit for switching the screen grid 77 from the plate 68 to the supply 70 when the plate 68 is no longer effectively directly connected to the positive terminal of the supply.

Figure 12:
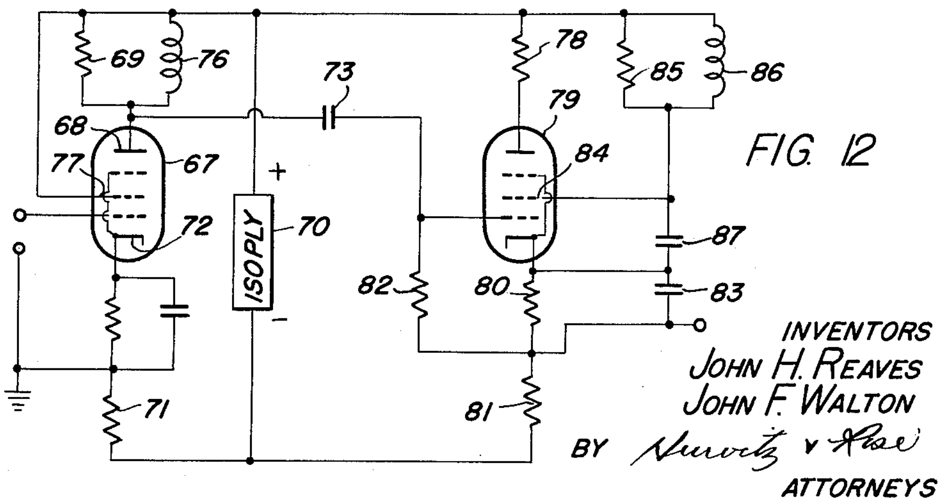
FIGURE 12 is a schematic wiring diagram illustrating the application of the circuit of FIGURE 11 to a bridge amplifier.

Referring now to FIGURE 12, a circuit is illustrated showing the utilization of pentodes in the bridge type arrangement originally illustrated in FIGURE 9. Those elements which are common to both FIGURES 11 and 12 carry the same reference numerals. In the circuit of FIGURE 12 the supply 70 has a voltage divider circuit connected thereacross comprising a resistor 78 which is equal to the D.C. resistance of the parallel combination of resistor 69 and inductor 76, a pentode 79 having a cathode resistor 80, and a balancing resistor 81 connected between the cathode resistor 80 and the negative terminal of the power supply 70. The pentode 79 is provided with a grid resistor 82 and its cathode resistor 80 is by-passed for high frequency signal voltages by a capacitor 83. The tube 79 has a screen grid 84 connected through a resistor 85 shunted by an inductor 86 to the positive terminal of the power supply 70 and the grid 84 is further connected through a capacitor 87 to the junction of tube 79's cathode and cathode resistor 80.

At low frequencies the circuit comprises a compensated bridge arrangement which compensates for supply voltage changes, changes in filament temperature, changes in emitter characteristics, etc. However, at high frequencies the tube 79 becomes a pentode cathode-follower amplifier. This provides a lower output impedance than would be possible otherwise.

Figure 13:
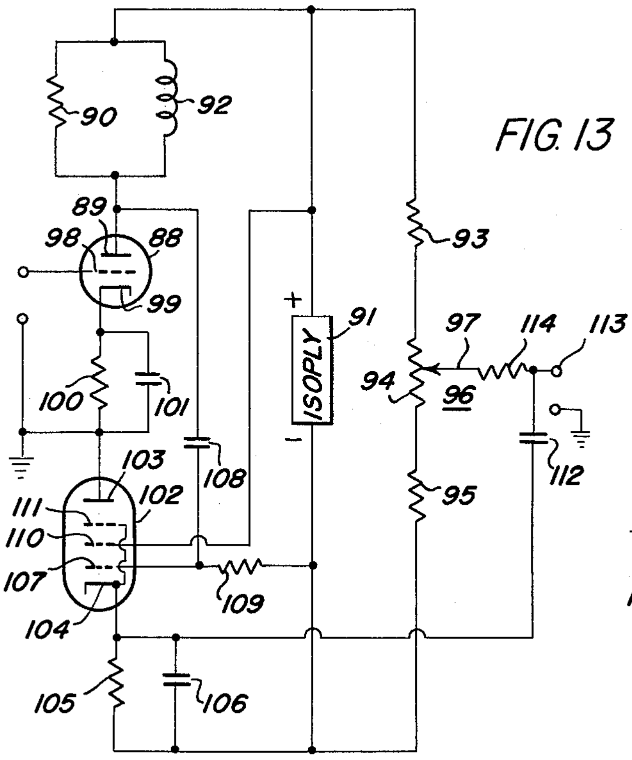
FIGURE 13 is a schematic wiring diagram of a constant current bridge amplifier utilizing the high frequency compensation techniques of FIGURE 7.

Referring now specifically to FIGURE 13 of the accompanying drawings there is provided a linear amplifier which is also arranged in a bridge circuit. A triode 88 has an anode 89 connected through a resistor 90 to the positive terminal of a power supply 91. The resistor 90 is shunted by an inductor 92 while the power supply is shunted by resistors 93, 94 and 95 which constitute one leg of a bridge. The resistor 94 constitutes the resistive element of a potentiometer 96 having a variable tap 97. The tube 88 has a signal grid 98 adapted to receive input signals to the circuit and a cathode 99 connected through a resistor 100 to ground. Resistor 100 is by-passed to ground for signal currents by a by-pass capacitor 101. A pentode 102 has its plate connected to ground; that is, to the lower end as viewed in FIGURE 13 of the cathode resistor 100 of tube 88 and has its cathode 104 connected through a cathode load resistor 105 to the negative terminal of the power supply 91. Cathode resistor 104 is by-passed for signal currents by means of a by-pass capacitor 106. The pentode 102 has a signal grid 107 connected through a capacitor 108 to the anode 89 of the tube 88. The grid 107 is further connected through a grid resistor 109 to the negative terminal of supply 91. The tube 102 is further provided with a screen grid 110 which is connected to the positive terminal of the power supply 91, and a suppressor grid 111 connected to its cathode 104. The tubes 88 and 102 and resistors 105, 100 and 90 constitute one leg of an impedance bridge the other leg of which is constituted by resistors 93, 94 and 95.

The pentode 102 is employed to provide constant current operation of the circuit. Specifically the pentode is normally a constant current device and therefore the current flowing through the triode 88 is substantially constant. The constant current feature of the apparatus is enhanced by means of the cathode resistor 105 of the pentode 102 since variations of signal potentials at low frequencies across the resistor 105 cause a change in the grid-cathode voltage of the tube 102 which further acts to maintain the current through the tube constant. In consequence, the triode 88 operates as a variable impedance and the plate characteristics of the tube are quite linear over an extended range of operation.

As the frequency of the signals increase and the inductive reactance of the inductor 92 begins to become appreciable, the pentode 102 begins to amplify the signals coupled to its grid 107 by means of the capacitor 108 and operates as a cathode follower amplifier. The signals appearing on the cathode 104 are coupled through the capacitor 112 to an output terminal and thus high frequency compensation is achieved.

Figure 14:
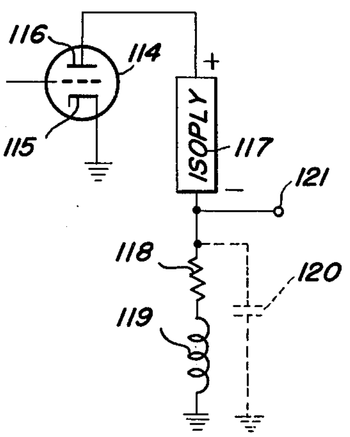
FIGURE 14 is a schematic wiring diagram of a fourth high frequency compensation circuit.

Referring now to FIGURE 14 of the accompanying drawings, there is illustrated still another circuit for compensating for the shunt capacitance to ground of the special anode supply of the aforesaid copending patent application of Walton and Reaves. A tube 114 has a cathode 115 connected to ground and an anode 116 connected to a positive terminal of the power supply 117. The negative terminal of supply 117 is connected to ground through a series circuit comprising a resistor 118 and an inductance 119. The resistor 118 and inductor 119 are shunted by the shunt capacity to ground 120 of the power supply 117. An output terminal 121 is connected to the junction of the negative terminal of supply 117 and the resistor 118. The D.C. resistance of the inductor 119 is quite small so that at low frequencies the resistor 118 represents substantially all of the load of the circuit and therefore the circuit conforms very closely to that illustrated in FIGURE 1 of the accompanying drawings. However, as higher frequencies are approached the effect of the inductance 119 becomes appreciable and in a specific embodiment of this circuit the inductance is made to resonate with the capacitor 120 which represents the shunt capacity to ground of the power supply 117. Due to the inclusion of the resistance 118 in the resonant circuit, the Q of the circuit is quite low and therefore the tuned circuit has quite a broad frequency response. The compensation provided by this circuit is comparable to that provided by the compensating circuit illustrated in FIGURE 2 of the accompanying drawings and has a decided advantage in that it may be combined with the circuit of FIGURE 10 to provide a circuit having an exceptionally wide frequency response.

Figure 15:
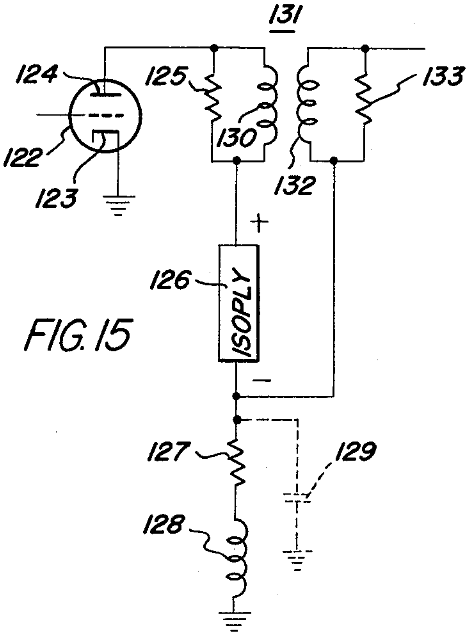
FIGURE 15 is a schematic wiring diagram of an amplifier circuit utilizing the high frequency compensation techniques of FIGURES 10 and 14.

Referring again to FIGURE 10, it was pointed out in the discussion of that figure that the inductances 62 and 64 were employed both for high frequency compensation for the shunt capacitance of the power supply and for compensating for the electrode capacities of the tubes in cascaded amplifier stages. Since the windings 62 and 64 have to perform a dual task they could not accomplish complete compensation of both factors. However, by combining the circuits of FIGURES 10 and 14 substantially complete compensation is achieved both for electric capacities of the tubes and the shunt capacity of the supply. Such a circuit is illustrated in FIGURE 15 of the accompanying drawings. In this figure a tube 122 has its cathode 123 grounded and its anode 124 connected through a resistance 125 to the positive terminal of a power supply 126. The negative terminal of power supply 126 is connected through a series circuit comprising a resistor 127 and an inductor 128 to ground potential. The resistance 127 and inductor 128 are shunted by the capacity to ground 129 of the supply 126. The resistor 125 is shunted by a primary winding 130 of the transformer 131 having a secondary winding 132 shunted by a resistor 133. The lower end of the winding 132, as viewed in FIGURE 15 is conected to the junction of the negative terminal of supply 126 and the resistor 127. The upper end of the winding 132 is adapted to be connected to the grid of the next succeeding stage of amplification (not illustrated).

The operation of the inductor 128 in the circuit is identical with the operation of the inductance 119 in the circuit of FIGURE 14. In this circuit, the windings 130 and 132 are employed principally to compensate for the interelectric capacities of the tube 122 and the tube of the next succeeding stage of amplification which is not illustrated. By properly choosing the values of the inductances 128, 130 and 132 the frequency response of this circuit can be made to extend beyond 60 mc./sec.

The circuit of FIGURE 14 or of FIGURE 15 may be included in a bridge circuit such as these illustrated in FIGURES 7, 8, 13, etc.

Figure 16:
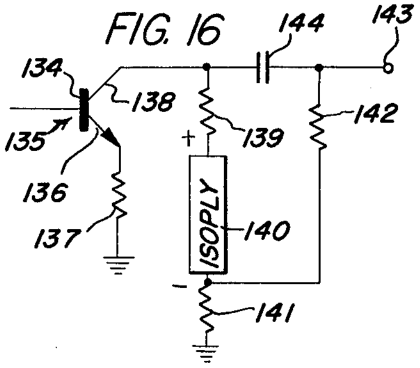
FIGURE 16 is a schematic wiring diagram illustrating the applicability of the high frequency compensation techniques of the invention to amplifiers employing transistors.

Referring now to FIGURE 16 of the accompanying drawings, there is illustrated an embodiment of the invention employing transistors for the amplifying element rather than electron tubes. In this embodiment of the invention signals are adapted to be applied to a base electrode 134 of a transistor 135 having an emitter 136 connected to ground through an emitter resistor 137 and having a collector electrode 138 connected through a resistor 139 to the positive terminal of an anode voltage source 140. The negative terminal source 140 is connected to ground through a load resistor 141. The negative terminal of the source 140 is also connected through a resistor 142 to an output terminal 143. The collector 138 of the transistor 135 is also connected through a capacitor 144 to the output terminal 143.

It will be noted that the circuit of FIGURE 16 is substantially identical with the circuit of FIGURE 2 of the accompanying drawings with the exception that the tube 9 of FIGURE 2 is replaced by the transistor 135. Other than this replacement, the circuits are identical. The FIGURE 16 is intended to show that in each of the circuits 2 through 10 and FIGURES 13 and 14 a transistor as illustrated in FIGURE 16 may be substituted for the triode in each of these figures.

It is to be understood that in all instances where a triode is illustrated in the other embodiments of the invention a transistor may be substituted therefor and in order for the polarities to be the same as those illustrated in the figures employing tubes, an NPN transistor is employed as illustrated in FIGURE 16 although by appropriate arrangement of biases PNP transistors may be employed with equal facility.

The term "Isoply" is the registered trademark of the assignee of the present invention and relates to the assignee's low capacity, isolated power supplies.

While we have described and illustrated one specific embodiment of our invention, it will be clear that variations of the details of construction which are specifically illustrated and described may be resorted to without departing from the true spirit and scope of the invention as defined in the appended claims.

What we claim is:

1. An amplifier comprising an amplifying element comprising, a common electrode, a third electrode, and a control electrode for controlling the flow of charge between said common and third electrodes, means adapted to supply a control signal to said control electrode, a high pass filter, connected between said third electrode and a first terminal of a voltage source, an impedance connected between said common electrode and said second terminal of the voltage supply, said first and second terminals having different voltages thereon, said impedance and the capacity to ground of said voltage source comprising a low pass filter, said low pass and said high pass filters being complementary, and means connecting said impedance to a source of reference potential at a point remote from said terminals of the voltage source.

2. The combination according to claim 1 wherein said high pass filter comprises an inductor and resistor connected in parallel.

3. The combination according to claim 2 further comprising a transformer having a primary winding and a secondary winding, said inductor comprising said primary winding.

4. The combination according to claim 3 wherein said primary winding has a value to produce resonance with the output interelectrode capacity of said amplifying element.

5. The combination according to claim 3 further comprising a further amplifying device having an input electrode, said secondary winding having an inductance such as to resonate with the input capacity of said further amplifying device.

6. The combination according to claim 2 wherein said amplifying element comprises a pentode having a screen grid, said screen grid being connected to said inductor remote from said third electrode.

7. The combination according to claim 6 further comprising a second pentode having a control electrode, means connecting said second pentode across said voltage source and means for coupling said third electrode of said first mentioned pentode to said control electrode of said second pentode.

8. The combination according to claim 1 comprising a voltage divider connected between said terminals of the voltage source and output circuit means interconnecting said third electrode and a point on said voltage divider.

9. The combination according to claim 8 wherein said voltage divider includes a further amplifying element having a control electrode, a common electrode and a third electrode, said common and third electrodes of said further amplifying element being connected in series with said source in said voltage divider, means for developing signal potentials between said control electrode and said common electrode.

10. The combination according to claim 9 further including a coupling capacitor connected between said third electrode of said first mentioned amplifying device and said control electrode of said further amplifying device, an output terminal, said voltage divider further comprising a common electrode resistor connected between said common electrode of said further amplifying element and said output terminal.

11. An amplifier comprising a pentode having a cathode, a control electrode, a screen electrode and an anode, a triode having a cathode, a control electrode and an anode, means connecting a high pass filter between said anode of said triode and a positive voltage terminal of a voltage source, means connecting said cathode of said pentode to a negative voltage terminal of said voltage source, a signal by-passed impedance interconnecting said cathode of said triode and said anode of said pentode, means for connecting said anode of said pentode to a reference potential, and said screen electrode of said pentode being connected to the positive terminal of said voltage source, said means for connecting said cathode of said pentode to said voltage source forming a low pass filter with the shunt capacity to ground of said voltage source, said high and low pass filters being complementary.

12. The combination according to claim 11 further comprising a voltage divider connected across said voltage source, an output terminal, means coupling said output terminal to said anode of said triode and means for connecting said output terminal to a variable voltage point on said voltage divider.

13. An amplifier comprising an amplifying element having an output electrode, a further electrode and a control electrode for controlling flow of charge between said output and said further electrodes, means for applying a signal to said control electrode, a series circuit including a source of voltage having a first terminal connected to said output electrode and a first impedance connected between a second terminal of the voltage source and said further electrode, said first impedance being connected to a reference potential at a point remote from said terminals of the voltage source, and reactive impedance means connected in said series circuit for compensating for the high frequency signal degradation resulting from the shunt capacity of the voltage source to the reference potential.

14. An amplifier comprising an amplifying element having a first electrode, a second electrode and a control electrode for controlling the flow of charge between said first and said second electrodes, means adapted to apply a control signal to said control electrode, a first impedance connected between said first electrode and a first terminal of a source of voltage, said first impedance having a point remote from said terminal connected to a reference potential, a second impedance connected between said second electrode and a second terminal of the voltage source, the terminals of the voltage source having different voltages developed thereon, a circuit for compensating for the high frequency signal degradation resulting from the shunt capacity of the voltage source, said circuit including said second impedance, an output terminal, first impedance means connecting said second electrode to said output terminal and further impedance means coupling the signal developed across said first impedance to said output terminal.

15. The combination according to claim 14 wherein said second impedance is a resistor and wherein said circuit means includes said first impedance means, said first impedance means comprising a capacitor, said second impedance and said capacitor constituting a differentiating circuit.

16. The combination according to claim 14 wherein said circuit means further includes an inductor connected in parallel with said second impedance.

17. The combination according to claim 14 further comprising an inductor connected in series with said first impedance between said first electrode and said first terminal, said inductor resonating with the shunt capacity of the voltage source at those frequencies at which said shunt capacity produces signal degradation, the Q of the resonant circuit being quite low.

18. An amplifier comprising an amplifying element having a first electrode, a second electrode and a control electrode for controlling the flow of charge between said first and said second electrodes, an inductance, a resistance, means connecting said inductance and said resistance in series between said first electrode and a first terminal of a voltage source, means connecting a point on one of said series connected resistance and inductance, remote from said terminal, to a reference potential, means connecting said second electrode to a second terminal on said voltage source, said first and second terminals having different voltage developed thereon, said inductor resonating with the shunt capacity of the voltage source at frequencies at which said shunt capacity produces signal degradation.

19. An amplifier comprising an amplifying element having an output electrode, a first electrode and a control electrode for controlling flow of charge between said output and said first electrodes, a first impedance connected between said output electrode and a first terminal of a voltage source, a second impedance connected between said first electrode and a second terminal of the voltage source, the first and second terminals having different voltages developed thereon, means connecting a point on said second impedance, remote from said terminals, to a reference potential, an output terminal, a capacitor interconnecting said output terminal and said output electrode, a third impedance interconnecting said output terminal and the junction of the second terminal of the voltage source and said second impedance, the time constant of said capacitor and said first and said third impedances being approximately equal to the time constant of said second impedance and the shunt capacity of the voltage source, and means adapted to supply a control signal to said control electrode.

References Cited in the file of this patent

UNITED STATES PATENTS

| | | |
|---|---|---|
| Re. 23,563 | Barney | Oct. 14, 1952 |
| 1,799,093 | Farnham et al. | Mar. 31, 1931 |
| 1,856,373 | Burton | May 3, 1932 |
| 2,174,166 | Plebanski | Sept. 26, 1939 |
| 2,549,833 | Martinez | Apr. 24, 1951 |

FOREIGN PATENTS

| | | |
|---|---|---|
| 456,032 | Canada | Apr. 19, 1949 |